July 9, 1946.  I. L. MURRAY ET AL  2,403,741
PROCESS FOR MAKING BUTADIENE
Filed Sept. 9, 1943
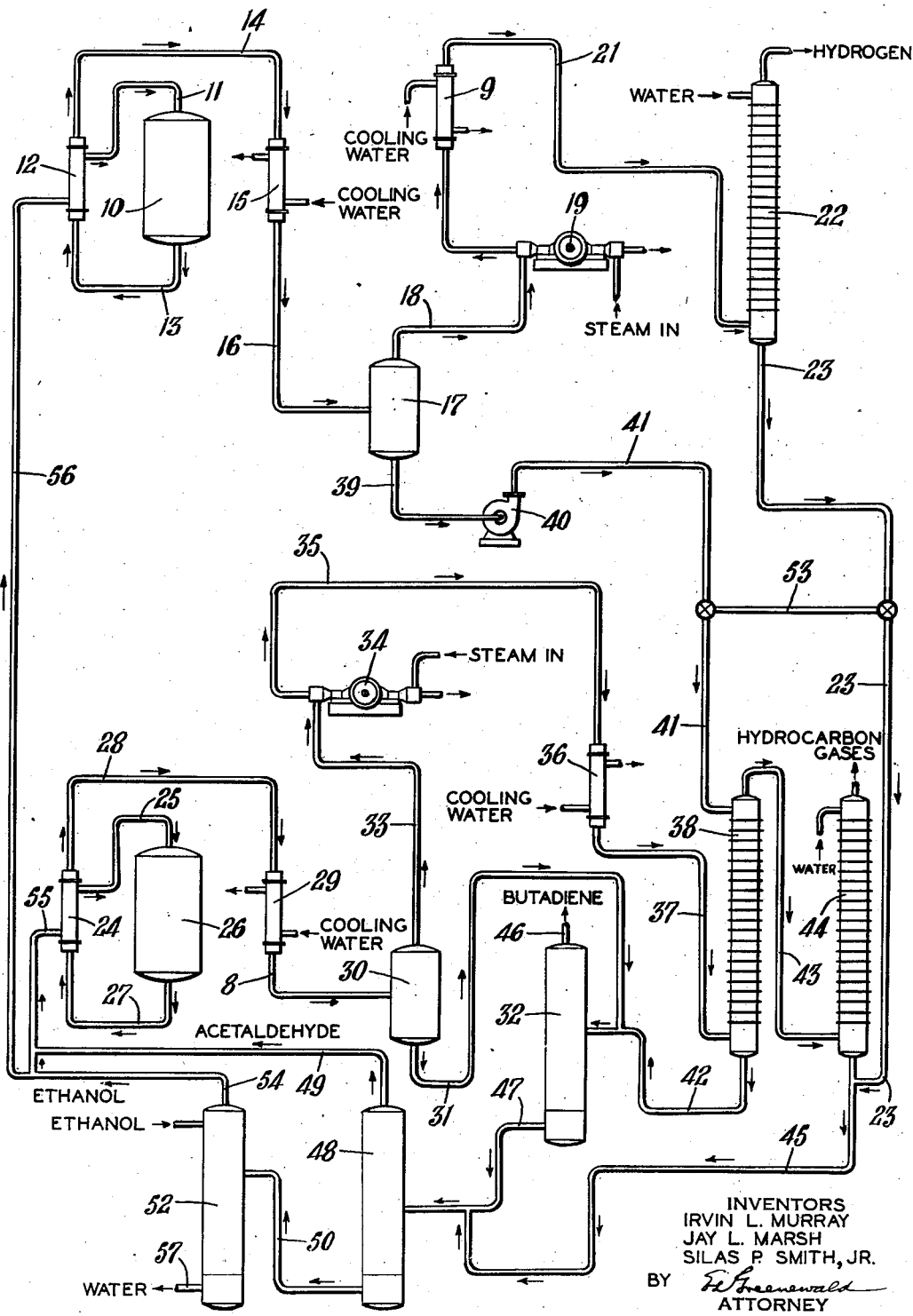
INVENTORS
IRVIN L. MURRAY
JAY L. MARSH
SILAS P. SMITH, JR.
BY Greenewald
ATTORNEY Patented July 9, 1946

2,403,741

UNITED STATES PATENT OFFICE 2,403,741

PROCESS FOR MAKING BUTADIENE

Irvin L. Murray, Charleston, and Jay L. Marsh, South Charleston, W. Va., and Silas P. Smith, Jr., Louisville, Ky., assignors to Carbide and Carbon Chemicals Corporation, a corporation of New York Application September 9, 1943, Serial No. 501,610

11 Claims. (Cl. 260—681)

This invention relates to a process for the recovery of butadiene from gaseous mixtures containing this hydrocarbon. The process is adapted for use in a method whereby butadiene is produced from ethanol in separate steps; one step being the conversion of ethanol to acetaldehyde, and the other step being the reaction of ethanol with acetaldehyde to produce butadiene.

Many processes have been suggested for the recovery of butadiene from gaseous mixtures containing mono-olefines, saturated hydrocarbons, hydrogen, carbon monoxide, carbon dioxide, and other gases. Liquefaction of the gases by compression and cooling, and separation of the butadiene by fractional distillation has been proposed, but such a process is not economical. Other expedients have involved treating the gas mixtures with substances capable of selectively absorbing butadiene from the other gases or reacting with it to form unstable products. Such materials have included liquid sulfur dioxide; aqueous solutions of salts of heavy metals of the first and second groups of the periodic system, such as aqueous solutions of cuprous chloride; chilled wash oil; and solvents, such as ethylene chlorhydrin or furfurol. All such systems are subject to the disadvantage that the liquid containing the absorbed or reacted butadiene must be treated in an independent step to recover the butadiene, and the absorbent or reactant purified for reuse in the process.

According to the present invention, butadiene is produced from ethanol in a process involving more than a single step whereby butadiene is recovered from a mixture of butadiene and other gases as an integral step in the process.

Preferably, the butadiene is produced by the coordinated operation of an acetaldehyde-producing reaction and a butadiene-producing reaction, wherein at least part of the reaction products from the acetaldehyde-producing reaction, containing ethanol and acetaldehyde, are employed is a scrubbing process to recover butadiene from other gases formed in the butadiene-producing reaction. In the one reaction, ethanol vapors are partly converted to acetaldehyde by any of the known methods. These include dehydrogenation of the ethanol over dehydrogenation catalysts, such as finely divided copper; or oxidation of the ethanol with air in the presence of suitable oxidation catalysts. In the other reaction, acetaldehyde and ethanol are reacted in the vapor state in the presence of suitable catalysts to form butadiene. Minor amounts of other products, such as mono-olefine gases, are also formed. A preferred catalyst for the reaction is described in W. J. Toussaint and J. T. Dunn application Serial No. 460,120, filed September 29, 1942. Other catalysts for this reaction are reported in the literature.

In the preferred embodiment of the invention, the scrubbing liquid employed in the process in which butadiene is dissolved and recovered from other gases formed in the butadiene-producing reaction, is distilled to separate the butadiene. The residue from this distillation may then be subjected to a series of distillations to recover the acetaldehyde and ethanol present in the scrubbing liquid. The recovered acetaldehyde is introduced as one of the reactants in the butadiene-producing reaction. The recovered ethanol may be recycled through the acetaldehyde-producing converter, or it may be introduced as a reactant in the butadiene-producing reaction, or it may be distributed to both reaction systems. In any event, the components of the scrubbing liquid, after expulsion of dissolved butadiene are employed as reactants in the series of reactions giving rise to butadiene. Make-up ethanol may be introduced at any convenient place in the cycle. In some instances, depending on the relative yields of the two reactions, the discharged scrubbing liquid, denuded of butadiene, may be recycled directly through the butadiene converter. Since the by-products which may accumulate in the system normally have a boiling point above that of butadiene, they may be removed, when such direct recycling is practiced, by withdrawing portions of the recycled scrubbing liquid in which such by-products have accumulated after expulsion of the butadiene, and subjecting such portions to a batch distillation. However, the by-products are more desirably removed by distilling them continuously from the recovered reactants.

Describing the reaction systems in somewhat more detail, the condensible products from the acetaldehyde-producing reaction, containing acetaldehyde and ethanol, are partially or wholly liquefied in a condenser. It is this condensate which serves as the scrubbing liquid for the butadiene-containing gases, and it is substantially free of the so-called permanent gases which would interfere with its intended function. Any of these permanent gases present in the reaction products leaving the condenser will be approximately saturated with vapors of this condensate, namely acetaldehyde and ethanol, and such gases are desirably compressed and scrubbed with water to recover the acetaldehyde and ethanol, although this is not essential for the practice of the present invention.

The outlet vapors and gases from the butadiene converter, containing butadiene, ethanol, acetaldehyde, diethyl ether, ethylene, propylene, butylene and saturated hydrocarbon gases and impurities are passed through a condenser. Here, most of the vapors may be liquefied but a considerable portion of butadiene is not condensed and leaves the condenser as a vapor in admixture with uncondensed acetaldehyde, ethanol, ether and permanent gases. According to this invention, the temperature and pressure of these vapors and gases are adjusted to values at which butadiene is readily absorbed in the scrubbing liquid, without substantial quantities of the other gases being dissolved. This may be done by cooling the vapors and gases without compressing them, by compressing the vapors and gases without cooling them, or by both compressing and cooling the vapors and gases to selected pressures and temperatures. Preferably the vapors and gases are compressed and cooled. After compression, the mixture of vapors and gases may be passed through a second condenser where the vapors are cooled and partially liquefied. The mixture from this second condenser is passed to the base of a scrubbing tower which may be either a packed tower or a bubble-cap column. The gas mixture, containing butadiene, passes up the scrubbing tower and is placed in intimate contact with the downward flowing liquid condensate from the acetaldehyde-producing reaction, containing both ethanol and acetaldehyde.

This mixture of ethanol and acetaldehyde is a solvent for almost all the olefine gases present, and separation of the gases is effected by the difference in vapor-pressure and by the difference in solubility between the gases, although the former factor is by far the most important. Each gas dissolves in the scrubbing liquid until the partial pressure of the gas in the gas mixture approaches equality to the partial pressure of the gas solute in the scrubbing medium. Since, for each gas, the partial pressure of the gas solute is some direct function of the product of the concentration of the gas solute in the scrubbing liquid and a constant, which is dependent, among other factors, on the temperature and on the solubility characteristics and volatility of the gases involved, the temperature of the scrubbing tower is maintained sufficiently high so that small amounts only of the lower-boiling gases, such as ethylene and propylene are dissolved. By maintaining the pressure in the scrubber, however, at a value correlated with the temperature of the scrubbing liquid, the butadiene as well as other hydrocarbons, such as butylene, of related solubility and boiling point, may be readily dissolved in the scrubbing liquid. When the temperature of the scrubbing liquid is about 5° C., a suitable pressure for the scrubbing operation is about 15 to 20 p. s. i. gauge, whereas at scrubbing liquid temperatures of about 38° C. suitable pressures are about 50 to 60 p. s. i. gauge. Even at the lower temperatures, however, higher pressures may be utilized, and less scrubbing liquid employed.

The heat released in the absorption of the gases by the solvent mixture results in an increase in temperature of the scrubbing liquid. The scrubbing liquid containing the absorbed butadiene, and some low-boiling hydrocarbons unavoidably dissolved, is removed from the base of the tower, whereas most of the lower-boiling mono- olefines and saturated hydrocarbon gases, denuded of butadiene, pass from the top of the tower. These gases are approximately saturated with the vapors of the scrubbing liquid, principally acetaldehyde and ethanol, and these products may be recovered by scrubbing the gases with water.

The process of this invention offers decided advantages over conventional practices, wherein independent scrubbing cycles are employed to separate butadiene from admixture with other gases. In such systems, the solvent used to absorb the butadiene is separately distilled to strip off the butadiene, and the solvent cooled for re-use in the absorption. By the process of this invention, the butadiene is absorbed in a solvent mixture which must usually undergo distillation in any event to produce acetaldehyde and ethanol for introduction to the butadiene converters. Therefore, by means of this invention, there is conserved that quantity of heat which would be required in the conventional process to raise the solvent to the distillation temperature required for stripping the butadiene therefrom, and there is conserved that quantity of cooling water which would be required to cool the solvent, after distillation, to its original temperature. In addition, the expense of the additional solvent itself and the unavoidable losses thereof are avoided. In addition, the process of this invention eliminates the installation of a distillation column with its appertaining equipment, and of the cooling system. In a large installation, these savings are appreciable.

A further advantage which attends the integrated cyclic process of this invention is that each reaction may be conducted at its optimum pressure. For instance, in the dehydrogenation of ethanol to acetaldehyde, it is desirable to maintain as low a pressure as possible in order to secure maximum yields. However, if the products from the acetaldehyde converter were introduced directly into the butadiene converter, it would be necessary to operate the acetaldehyde converter at undesirably high pressures, or to compress the gases before entering the butadiene converter. Additionally, the integrated process permits the removal of by-products from the acetaldehyde reaction, such as hydrogen, which might otherwise tend to injure the catalyst employed in the butadiene reaction, or reduce the yield of butadiene obtained.

One means of practicing the present invention will now be described with reference to the attached drawing, but the invention is not limited to the specific equipment or operating conditions set forth. All percentage compositions given are by weight.

Ethanol vapors along with about 10% water vapor are introduced to a converter 10 of the shell-and-tube type, through a pipe 11, after passing through a heat exchanger 12. The converter contains a copper catalyst at a temperature of about 280° C. and part of the ethanol introduced is dehydrogenated to acetaldehyde in passing over this catalyst. The converter may be heated by circulating a high-boiling organic liquid through heating elements in the converter. The vapors leave the bottom of the converter through a pipe 13, pass through the heat exchanger 12 used to preheat the feed, and pass through a pipe 14 to a condenser 15, in which most of the vapors are condensed. The uncondensed vapors, the gases and the condensate pass through a pipe 16 to a separating tank 17, in which the condensate collects at the bottom. The uncondensed vapors and gases containing acetaldehyde, ethanol, water and hydrogen pass from the top of the tank 17 through a pipe 18 to a compressor 19, where they are compressed to a pressure of about 55 p. s. i. gauge. The compressed vapors and gases pass through a condenser 9, from which they are introduced through a pipe 21 to the base of a scrubbing tower 22. Here, the water-soluble vapors are removed from the hydrogen by means of scrubbing water, and the liquid effluent flows through pipe 23 and then through pipe 45 to distillation column 48 for recovery of the acetaldehyde.

The chemical reaction producing butadiene is conducted concurrently with that producing acetaldehyde. In this second chemical reaction, a mixture of ethanol and acetaldehyde vapors, in the molar ratio of about 3 to 1, are passed through a heat exchanger 24 and then through a pipe 25 to a converter 26 of a type similar to converter 10. The converter contains a catalyst of a suitable type at a temperature of 300° to 350° C. Part of the ethanol and acetaldehyde entering the converter react to form butadiene in major amounts, and lower hydrocarbons and other by-products in minor amounts, and the effluent vapors pass through a pipe 27 to the heat exchanger 24 which preheats the reactants. The vapors leave the heat exchanger through a pipe 28 and pass to a condenser 29, where somewhat more than half the butadiene and acetaldehyde, and almost all the ethanol are condensed. The vapors and condensate pass through pipe 8 to a settling tank 30, where the condensate is drawn off through a pipe 31 and passed to a distillation column 32 to separate the butadiene. The vapors and gases from the settling tank 30 may contain about 20% butadiene, as well as other volatile constituents, such as acetaldehyde, ether, ethanol and about 10% of mono-olefines and saturated hydrocarbon gases, and these vapors and gases pass through a pipe 33 to a compressor 34 where they are compressed to about 55 p. s. i. gauge.

The compressed vapors and gases pass through a pipe 35 to a condenser 36, where they are cooled to a temperature of about 38° C. Part of the vapors condense under these conditions and the condensate and uncondensed vapors and gases are introduced under pressure through pipe 37 to the base of a scrubbing tower 38, which may have about 40 trays when designed to scrub feed as described above. The first condensate from the acetaldehyde-producing reaction is withdrawn from tank 17 through a pipe 39 and pumped by a pump 40 through a pipe 41 to the top of tower 38. This condensate may contain about 8 parts of acetaldehyde, 70 parts of ethanol, 13 parts of water and 2 parts of acetic acid and may be at a temperature of 38° C. depending on the temperature of the condenser water available. This mixture of ethanol and acetaldehyde is a strong solvent for butadiene, even in the presence of a small amount of water, and it is capable of scrubbing completely the butadiene from the ascending vapors when employed in amounts about equal to, or even somewhat less than, that of the vapors and condensate entering the base of the scrubbing tower at the particular temperatures, pressures and concentrations specified. If all the condensate is not required as scrubbing liquid, part of it may be withdrawn through by-pass pipe 53 to pipe 23, and thence to distillation column 48 to recover the acetaldehyde. The liquid effluent from the base of the scrubbing tower contains substantially all the butadiene and is withdrawn through pipe 42 to the distillation column 32 in which butadiene is removed as a distillate.

The gases leaving the top of tower 38 are approximately saturated with the components of the scrubbing liquid, principally acetaldehyde and ethanol, and it is economical to recover these materials. To effect the recovery of the acetaldehyde and ethanol, the gases are passed through a pipe 43 to a second scrubbing tower 44, where they are subjected to the washing action of a downward flowing stream of water. The liquid efflux from the tower passes through pipe 45 to distillation column 48 in which the acetaldehyde is distilled. The gases from this scrubbing tower, containing mono-olefines, such as ethylene and propylene, saturated hydrocarbon gases, and some carbon dioxide and carbon monoxide are discharged from the system, and may be employed as fuel.

The distillation column 32 separates butadiene as a distillate, which is removed through pipe 46 for purification. Residue from column 32 may be treated in various ways to remove by-products, such as by distillation, but it ultimately passes through pipe 47 to distillation column 48 in which acetaldehyde is distilled as a vapor, and fed through pipe 49 to the butadiene converter 26. Distillation column 48 may also be made of such size so as to recover the acetaldehyde from the aqueous scrubbing liquids discharged from the towers 22 and 44, but this is not essential for the practice of the present invention. The residue from column 48 passes through pipe 50 to distillation column 52, in which ethanol vapors are removed through pipe 54. Part of the ethanol is diverted through pipe 55 to the butadiene converter 26, and part of the ethanol passes through pipe 56 to the acetaldehyde converter 10. Make-up ethanol may be supplied either to the acetaldehyde converter, or to the butadiene converter, or to both converters, with consequent alterations in the amount of recycled ethanol introduced to each reaction system. Preferably, however, as shown in the drawing the make-up ethanol is supplied as part of the reflux for the ethanol column, in which instance, it would ordinarily be passed to both converters. The aqueous residue from column 52 is withdrawn through pipe 57, and may be used for heating purposes. It is understood that the distillation system described has been purposely simplified in order to illustrate more clearly the cyclic nature of the system. Details of an appropriate recovery distillation system are disclosed in our copending application, Serial No. 501,611, entitled "Process for making butadiene."

Modifications of the invention other than as shown in the preceding example will be apparent to those skilled in the art. Thus, the pressures shown may be altered when gas mixtures of different composition are scrubbed in scrubber 38 and when the scrubbing liquid is at different temperatures, to insure liquefaction and solution of the butadiene in preference to lower-boiling hydrocarbon gases. Alternatively, the pressure may be kept constant, and an increase in the temperature of the scrubbing liquid, or in the quantity of butadiene in the gases to be scrubbed may be compensated for by increasing the quantity of scrubbing liquid employed.

We claim:

1. In a process for making butadiene from ethanol, in which ethanol is passed to a reaction zone and a part of such ethanol converted to acetaldehyde, and in which ethanol and acetaldehyde are converted in a separate reaction zone to hydrocarbons including butadiene in major amounts and lower hydrocarbons having less than four carbon atoms in minor amounts, the step of removing butadiene from said lower hydrocarbons which comprises passing a liquid mixture of ethanol and acetaldehyde obtained from said first reaction countercurrently to a gaseous mixture containing butadiene and said lower hydrocarbons, absorbing butadiene in said liquid mixture and removing said liquid mixture from contact with said gaseous mixture.

2. In a process for making butadiene from ethanol, in which ethanol vapors are passed to a reaction zone, a part of such vapors converted to acetaldehyde and a condensate comprising ethanol and acetaldehyde separated from the reaction products, and in which ethanol and acetaldehyde vapors are converted in a separate reaction zone to hydrocarbons including butadiene in major amounts and lower hydrocarbons having less than four carbon atoms in minor amounts, the step of separating butadiene from said lower hydrocarbons which comprises passing said condensate countercurrently to a gaseous mixture containing butadiene and said lower hydrocarbons, dissolving butadiene in said condensate, and removing said condensate from contact with said gaseous mixture.

3. In a process for making butadiene from ethanol, in which ethanol vapors are passed to a reaction zone, a part of such vapors converted to acetaldehyde and a condensate comprising ethanol and acetaldehyde separated from the reaction products, and in which ethanol and acetaldehyde vapors are converted in a separate reaction zone to hydrocarbons including butadiene in major amounts and lower hydrocarbons having less than four carbon atoms in minor amounts and the reaction products partially condensed, the step of separating butadiene from uncondensed hydrocarbon gases which comprises passing said condensate of ethanol and acetaldehyde countercurrently to said gases, dissolving butadiene in said condensate, and removing said condensate from contact with said hydrocarbon gases.

4. In a process for making butadiene from ethanol, in which ethanol vapors are passed to a reaction zone, a part of such vapors dehydrogenated to acetaldehyde and a condensate comprising ethanol and acetaldehyde separated from the reaction products, and in which ethanol and acetaldehyde vapors are converted in a separate reaction zone to hydrocarbons including butadiene in major amounts and lower hydrocarbons having less than four carbon atoms in minor amounts, and the reaction products subjected to at least two condensations in which a subsequent condensation is at a higher pressure than a preceding condensation, the step of separating butadiene from uncondensed hydrocarbon gases which comprises passing said condensate of ethanol and acetaldehyde countercurrently to said gases under a pressure of about 15 to about 60 pounds per square inch gauge so as to dissolve butadiene in said condensate, and removing said condensate from contact with said hydrocarbon gases.

5. Process for making butadiene which comprises passing a mixture of acetaldehyde and ethanol to a reaction zone to form a gaseous mixture containing butadiene, separately passing ethanol to a reaction zone to convert part of the ethanol to acetaldehyde, cooling the reaction products of the ethanol to form a condensate containing ethanol and acetaldehyde, bringing this condensate into intimate contact with the gaseous mixture to recover butadiene therefrom by dissolving it in said condensate, heating the condensate to expel dissolved butadiene therefrom and recovering said butadiene, and passing at least part of the residue of the condensate, after expulsion of dissolved butadiene therefrom, to a reaction zone to form a gaseous mixture containing butadiene.

6. Cyclic process for making butadiene which comprises passing a mixture of acetaldehyde and ethanol to a reaction zone to form a gaseous mixture containing butadiene, separately passing ethanol to a reaction zone to convert part of the ethanol to acetaldehyde, cooling the reaction products of the ethanol to form a condensate containing ethanol and acetaldehyde, bringing this condensate into intimate contact with the gaseous mixture to recover butadiene therefrom by dissolving it in said condensate, heating the condensate to expel dissolved butadiene therefrom and recovering said butadiene, and returning at least part of the residue of the condensate, after expulsion of dissolved butadiene, to the butadiene-forming reaction zone.

7. Cyclic process for making butadiene which comprises passing a mixture of acetaldehyde and ethanol to a reaction zone to form a gaseous mixture containing butadiene, separately passing ethanol to a reaction zone to convert part of the ethanol to acetaldehyde, cooling the reaction products of the ethanol to form a condensate containing ethanol and acetaldehyde, bringing this condensate into intimate contact with the gaseous mixture to recover butadiene therefrom by dissolving it in said condensate, heating the condensate to expel dissolved butadiene therefrom and recovering said butadiene, withdrawing a portion of said condensate, and returning the residue of the condensate, after expulsion of dissolved butadiene, to the butadiene-forming reaction zone.

8. Cyclic process for making butadiene which comprises passing a mixture of acetaldehyde and ethanol to a reaction zone to form a gaseous mixture containing butadiene, separately passing ethanol to a reaction zone to convert part of the ethanol to acetaldehyde, cooling the reaction products of the ethanol to form a condensate containing ethanol and acetaldehyde, bringing this condensate into intimate contact with the gaseous mixture to recover butadiene therefrom by dissolving it in said condensate, heating the condensate to expel dissolved butadiene therefrom and recovering said butadiene, distilling the remainder of the condensate after expulsion of dissolved butadiene, to separate acetaldehyde, passing the separated acetaldehyde to the butadiene-producing reaction zone, subjecting the residue from this distillation to an additional distillation to separate ethanol, returning this ethanol to at least one reaction zone, and supplying make-up ethanol to at least one reaction zone.

9. Cyclic process for making butadiene which comprises passing a mixture of acetaldehyde and ethanol to a reaction zone to form a gaseous mixture containing butadiene, separately passing ethanol to a reaction zone to convert part of the ethanol to acetaldehyde, cooling the reaction products of the ethanol to form a condensate containing ethanol and acetaldehyde, bringing this condensate into intimate contact with the gaseous mixture to recover butadiene therefrom by dissolving it in said condensate, heating the condensate to expel dissolved butadiene therefrom and recovering said butadiene, distilling the remainder of the condensate after expulsion of dissolved butadiene, to separate acetaldehyde, passing the separated acetaldehyde to the butadiene-producing reaction zone, subjecting the residue from this distillation to an additional distillation to separate ethanol, and returning this ethanol together with make-up ethanol to both reaction zones.

10. Cyclic process for making butadiene which comprises passing a mixture of acetaldehyde and ethanol to a reaction zone to form a gaseous mixture containing butadiene, separately passing ethanol to a reaction zone to convert part of the ethanol to acetaldehyde, cooling the reaction products of the ethanol to form a condensate containing ethanol and acetaldehyde, bringing this condensate into intimate contact with the gaseous mixture to recover butadiene therefrom by dissolving it in said condensate, heating the condensate to expel dissolved butadiene therefrom and recovering said butadiene, distilling the remainder of the condensate after expulsion of dissolved butadiene, to separate acetaldehyde, passing the separated acetaldehyde to the butadiene-producing reaction zone, subjecting the residue from this distillation to an additional distillation to separate ethanol, returning this ethanol to both reaction zones and supplying make-up ethanol to the reaction zone producing butadiene.

11. Cyclic process for making butadiene which comprises passing a mixture of acetaldehyde and ethanol to a reaction zone to form a gaseous mixture containing butadiene, separately passing ethanol to a reaction zone to convert part of the ethanol to acetaldehyde, cooling the reaction products of the ethanol to form a condensate containing ethanol and acetaldehyde, bringing this condensate into intimate contact with the gaseous mixture to recover butadiene therefrom by dissolving it in said condensate, heating the condensate to expel dissolved butadiene therefrom and recovering said butadiene, distilling the remainder of the condensate after expulsion of dissolved butadiene, to separate acetaldehyde, passing the separated acetaldehyde to the butadiene-producing reaction zone, subjecting the residue from this distillation to an additional distillation to separate ethanol, returning at least part of this ethanol to the reaction zone producing butadiene, and supplying make-up ethanol to the reaction zone producing acetaldehyde.

IRVIN L. MURRAY.
JAY L. MARSH.
SILAS P. SMITH, Jr.